United States Patent
Beran

(10) Patent No.: US 7,272,227 B1
(45) Date of Patent: Sep. 18, 2007

(54) DELIVERY OF DATA VIA OMNIDIRECTIONAL DIGITAL TRANSMISSION

(76) Inventor: David Beran, c/o Irena Langrova, Skretova/48, Plzen (CZ) 30100

( * ) Notice: Subject to any disclaimer, the term of this patent is extended or adjusted under 35 U.S.C. 154(b) by 963 days.

(21) Appl. No.: 10/075,112

(22) Filed: Feb. 12, 2002

(51) Int. Cl.
*H04N 7/167* (2006.01)
*H04N 7/20* (2006.01)

(52) U.S. Cl. .......................... 380/241; 725/67; 725/68

(58) Field of Classification Search ................. 713/193
See application file for complete search history.

(56) References Cited

U.S. PATENT DOCUMENTS

| | | | | |
|---|---|---|---|---|
| 5,291,554 A | * | 3/1994 | Morales | 380/211 |
| 5,651,064 A | * | 7/1997 | Newell | 705/51 |
| 6,633,982 B1 | * | 10/2003 | Kurzeja | 713/193 |
| 2003/0005449 A1 | * | 1/2003 | McKenna et al. | 725/78 |

* cited by examiner

*Primary Examiner*—Nasser Moazzami
*Assistant Examiner*—Pramila Parthasarathy
(74) *Attorney, Agent, or Firm*—Thelen Reid Brown Raysman & Steiner LLP

(57) ABSTRACT

Delivery of audiovisual data may be accomplished using a satellite system. The user may have a set-top box connected to a satellite dish and a network connection. An operator server may receive a request for a title from the user via the network connection. The operator server may then determine if the title is in a transmission schedule and add it to the schedule if it is not. The data corresponding to the request may be encrypted using an encryption algorithm, and a corresponding decryption key may be generated. The key may then be forwarded to the user via the network connection. Then, according to the transmission schedule, the database containing the data will forward the data to a transmitter where it is communicated to a satellite in orbit, which then communicates the data to the satellite dish. The data may be stored in the set-top box for later playback.

39 Claims, 3 Drawing Sheets

DELIVERY OF DATA VIA OMNIDIRECTIONAL DIGITAL TRANSMISSION

FIELD OF THE INVENTION

The present invention relates to the transmission of data. More particularly, the present invention relates to the delivery of data to a user via omnidirectional digital transmission.

BACKGROUND OF THE INVENTION

Watching movies has been a favorite pastime for many years. In the early days of television (TV), the only way to watch a movie at home would be if one of the television networks decided to broadcast it. The invention and popularization of the video cassette recorder (VCR) allowed consumers to watch movies in their homes whenever they wished. This spawned a multibillion dollar industry for video rentals. Cable television also provided a source for at-home movies.

Currently, there are three main methods used for delivery via digital broadcast:

Satellite transmission
Terrestrial digital transmission
Digital cable networks

In most cases the format for delivery of video is MPEG-2, which has now become the de-facto standard.

Currently, however, there are no technologies available to properly fit the Video-on-demand market. This is mainly due to the absence of user interaction or feedback. Currently the only interaction provided is by primitive means such as telephone. However, the user cannot influence the transmission schedule.

Another method for delivering Video-on-demand is via classic Internet. This allows the user full interaction in selecting the movies. However, this method is not available to everyone, mainly due to the lack of possible connectivity or access to a link with high enough bandwidth to allow an efficient means of movie delivery.

Thus, currently the most popular video on demand services are through satellite television and digital cable. Again, the major drawback of these movies, however, is that they must be viewed at particular times. While the extra channel bandwidth provided by satellite and digital cable allow for starting times every half hour for most movies, this may still be inconvenient for many viewers, who may want to begin watching a movie whenever they wish. Additionally, pausing the movies is not possible if the viewer is interrupted during the show (such as by a telephone call).

Therefore, a need exists for a more effective video-on-demand service.

BRIEF DESCRIPTION OF THE INVENTION

Delivery of audiovisual data may be accomplished using a satellite system. The user may have a set-top box connected to a satellite dish and a network connection. An operator server may receive a request for a title from the user via the network connection. The operator server may then determine if the title is in a transmission schedule and add it to the schedule if it is not. The data corresponding to the request may be encrypted using an encryption algorithm, and a corresponding decryption key may be generated. The key may then be forwarded to the user via the network connection. Then, according to the transmission schedule, the database containing the data will forward the data to a transmitter where it is communicated to a satellite in orbit, which then communicates the data to the satellite dish. The data may be stored in the set-top box for later playback.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
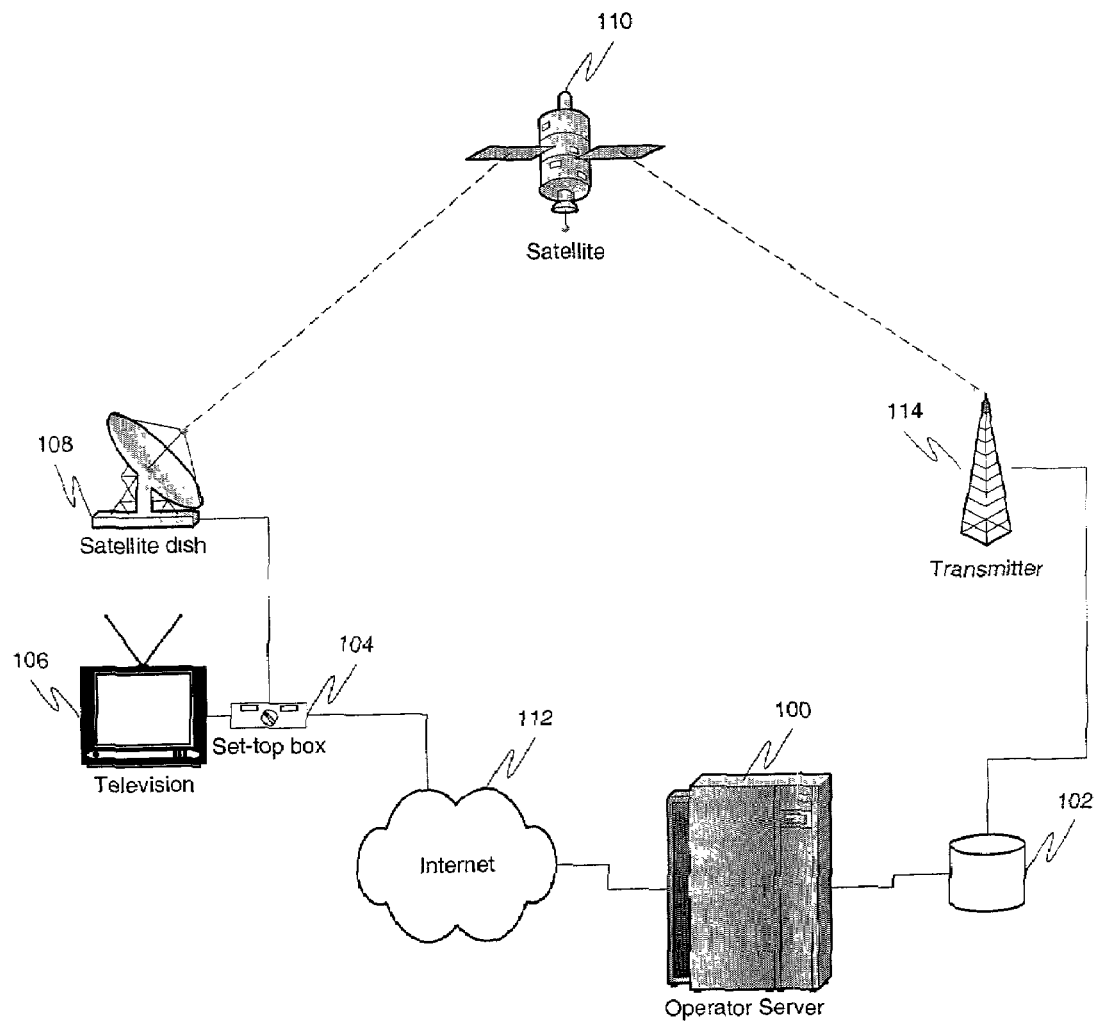
FIG. 1 is a block diagram illustrating a system for delivering data via omnidirectional digital transmission in accordance with a specific embodiment of the present invention.

FIG. 1 is a block diagram illustrating a system for delivering data via omnidirectional digital transmission in accordance with a specific embodiment of the present invention. In one embodiment of the present invention, the data represents movies ordered by a user. However, embodiments are possible with many other types of data as well, including other audiovisual data such as music or television programs. The company delivering the movies operates an operator server 100 coupled to a database 102. The database 102 stores the movies available for purchase. Preferably, this database will contain all the movies currently available for purchase, however one of ordinary skill in the art will recognize that it may be more efficient to have multiple databases, or that certain movies may be located elsewhere either temporarily or permanently. Furthermore, the operator server 100 may comprise many different operator servers to improve performance and convenience. Nevertheless, the operator server 100 has access to the movies. In a specific embodiment of the present invention, the movies may be stored in MPEG-II DBV-S format, the current standard used for satellite transmissions.

The user is provided with a set-top box 104, which may be attached to a television set 106. The user may also be provided with a satellite dish 108, which is connected to the set-top box 104 and is aimed in such a manner that it can receive satellite transmissions from a satellite 110 in geosynchronous orbit around the Earth. The set-top box 104 is then coupled to the operator server 100 via the Internet 112. In a specific embodiment of the present invention, the set-top box contains a modem which may dial an Internet Service Provider (ISP) and connect the set-top box 104 with the operator server 110. However, alternative embodiments are possible where the set-top box is connected to a Local Area Network (LAN), Digital Subscriber Line (DSL), or other network and the set-top box contains appropriate architecture to interface with such a network.

A transmitter 114 is coupled to the database 102 and is designed to transmit movies to the satellite 110 for distribution to users.

Figure 2:
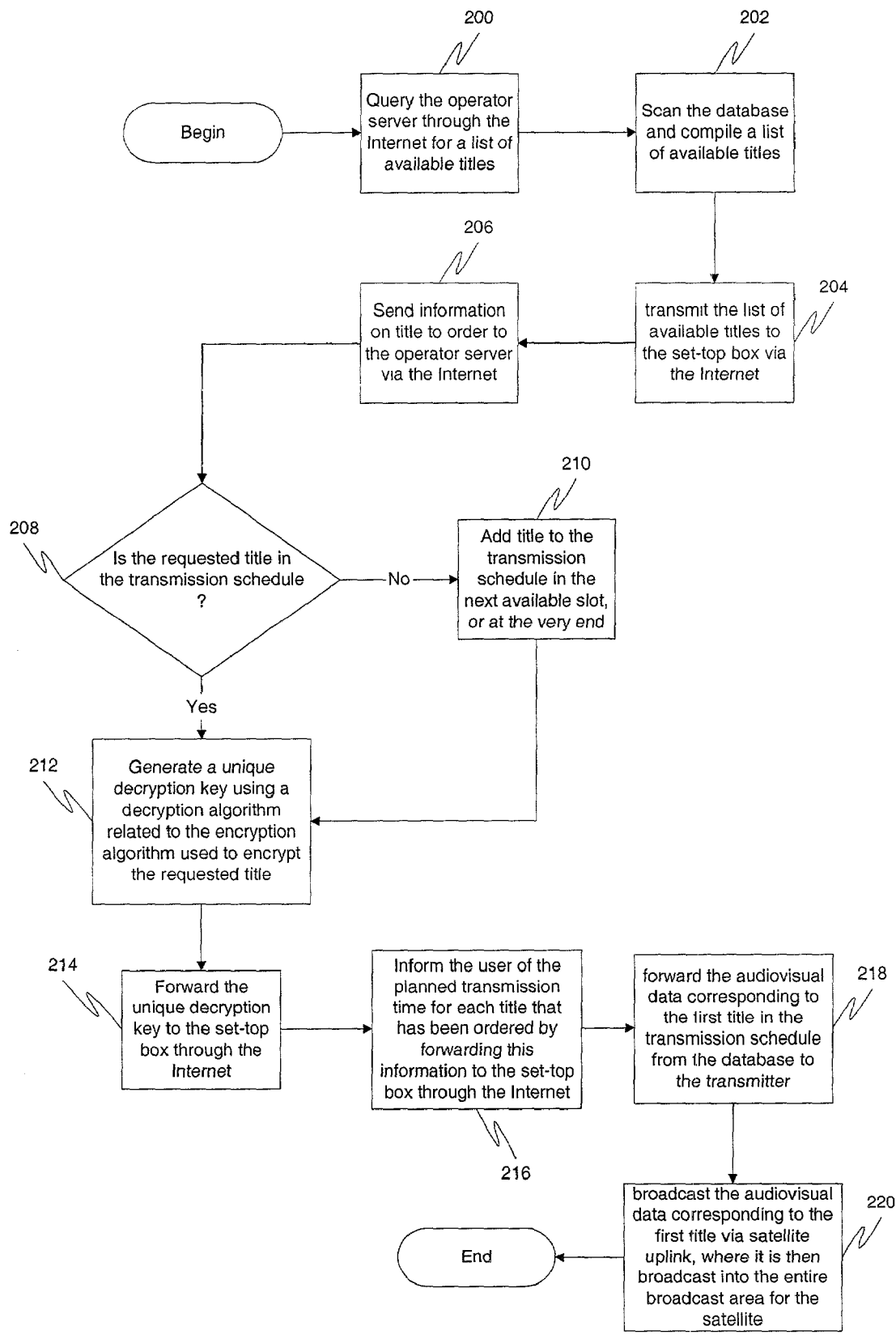
FIG. 2 is a block diagram illustrating a method for delivering data via omnidirectional digital transmission in accordance with a specific embodiment of the present invention.

FIG. 2 is a flow, diagram illustrating a method for delivering data via omnidirectional digital transmission in accordance with a specific embodiment of the present invention. References to FIG. 1 will accompany the description of the process described in FIG. 2. When a user wishes to view a movie, the method is begun. First, at 200, the set-top box 104 queries the operator server 100 through the Internet 112 for a list of available titles. At 202, the operator server 100 then compiles a list of the available titles by scanning the database 102. At 204, the list of available titles may be transmitted to the set-top box 104 via the Internet 112. Alternatively to 200-204, the operator server 100 may just periodically scan the database 102 to determine available titles and broadcast this information through the satellite 110.

When a user selects a title to order, this information is sent from the set-top box 104 to the operator server 100 via the Internet 112 at 206. The operator server 100 collects orders from many users. Then a transmission schedule is compiled. This transmission schedule is constantly updated as orders come in. How the movies are scheduled for transmission is determined by the following guidelines:

1) If the requested movie has not yet been added to the transmission schedule, it is added.

2) If the requested movie has already been added to the transmission schedule (most likely by it being previously ordered by another user).

3) If the transmission schedule is empty, the most requested movies are queued for transmission.

Since it does not any additional money to transmit movies, it is more efficient if the queue is never empty. Therefore, in accordance with the third guideline listed above, a statistical analysis of the frequency with which the movies are ordered is undertaken, and a preemptive transmission schedule can be created. This preemptive schedule may even be viewed by the user via the set-top box as many users may have trouble selecting from a huge library of movies and may want to simply select one of the more popular selections.

Figure 3:
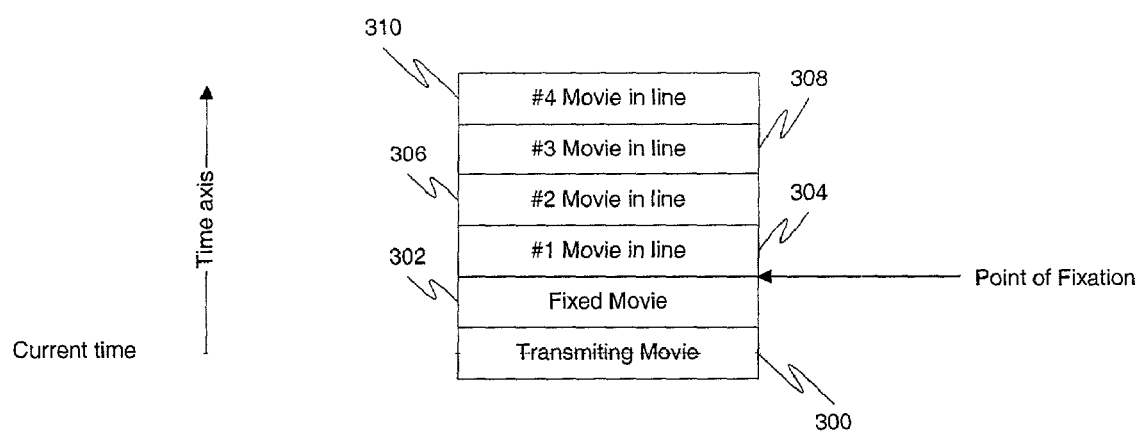
FIG. 3 is a diagram illustrating an example of a transmission schedule in accordance with a specific embodiment of the present invention.

FIG. 3 is a diagram illustrating an example of a transmission schedule in accordance with a specific embodiment of the present invention. There are six movies in the schedule. The transmitting movie 300 is the one currently being broadcast by the transmitter. The fixed movie 302 is next in line, but is at a point such that it cannot be modified, thus it has been fixed at a point of fixation. The rest of the movies 304, 306, 308, 310 represent simply the line of movies in the schedule. As the movie transmission finishes, all remaining movies then move up a spot.

Returning to FIG. 2, at 208 it is determined if the requested movie has been added to the transmission schedule already. At 210, if it has not, it is added in the next available slot, or at the very end of the current transmission schedule. The movie is already encrypted by an encryption algorithm. In a specific embodiment of the invention, the encryption algorithm is based on the Pretty Good Privacy (PGP) standard. At 212, a unique decryption key is generated using a decryption algorithm related to the encryption algorithm. The key is valid only for the particular movie and the particular user. At 214, the unique decryption key is forwarded by the operator server 100 to the set-top box 104 through the Internet 110. At 216, the operator server may then also inform the user of the planned transmission time for each title that has been ordered. Once again, this information is forwarded by the operator server 100 to the set-top box through the Internet 110. At this point, the set-top box may cease connectivity with the operator server.

According to the transmission schedule, at 218 the first title in the list is forwarded from the database 102 to the transmitter 114. Then at 220 the movie is broadcast from the transmitter via satellite uplink to the satellite 110, where it is then broadcast into the whole broadcast territory typical for that satellite, otherwise known as the satellite footprint. In a specific embodiment of the present invention, the broadcast is via a satellite uplink and via omnidirectional broadcast in the Ku band (Frequency range: 10,950 MHz −11,700 MHz, L.O. Frequency: 10,000 MHz, Output Frequency: 950-1750 MHz, Noise figure 0.8 to 1 dB, L.O. temperature stability +/−150 KHz to +/−300 KHz, L.O. phase noise −65 dBc/Hz at 1 KHz, Conversion gain 60 DB (+/−0.5 dB/25 MHz segment), Power requirements +15 to +24VDC, 150 mA).

In a specific embodiment of the present invention, the set-top box 104 may additionally contain a storage device such as a hard drive, which can store a number of movies. This allows the set-top box to receive the movie and then play it back for the user whenever the user wishes, even allowing the user to pause or rewind the movie if interrupted. This also allows the length of time of the satellite transmission of the movie to be different from the movie's playing time, thus allowing the delivery company to deliver the movie faster or slower than the typical broadcast time depending upon efficiency and bandwidth. It is also possible for the delivery company to encode a maximum number of replays within the movie as stored on the set-top box, preventing the user from viewing the movie more than a predetermined number of times by automatically deleting it once the limit is reached.

At 222, the movie is received by the set-top box and stored in the storage device. Then, at 224 the movie may be decrypted using the decryption key and the movie may be viewed.

Alternatively to satellite transmission, movie distribution may also be accomplished via terrestrial digital transmission. Any data circuit with sufficient bandwidth can be used for the transfer of movies from data storage to the transmitter. A terrestrial transmitter may then be used for the transmission of movies through the DVB-T standard. DVB-T is the standard format for transmitting TV signals. The broadcast signal from this transmitter is within the norms or standards generally used for terrestrial transmission and can be received by a standard TV set through the use of a standard TV antenna.

Another alternative is to distribute the movies via a digital cable network. Again, any data circuit with sufficient bandwidth may be used to transfer the movies from data storage to the transmitter. The transmitter may be any equipment capable of transmitting into the Digital Cable Network using the DVB-S standard.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for delivery of audiovisual data to a user, including:
   receiving a request for audiovisual data from the user via a network, said audiovisual data corresponding to said request having a title;
   determining if said title is already in a transmission schedule;
   adding said title to said transmission schedule if it is not already in said transmission schedule;
   encrypting said audiovisual data corresponding to said request using an encryption algorithm, said encryption algorithm having a corresponding decryption algorithm;
   generating a decryption key unique to the user using said corresponding decryption algorithm;
   forwarding said decryption key to the user via said network; and
   transmitting said encrypted audiovisual data corresponding to said request to a satellite for receipt by the user with a satellite dish, said transmitting occurring in accordance with said transmission schedule, wherein the user has a set-top box coupled to said network, and the satellite dish coupled to the set-top box, wherein the set-top box contains a storage device.

2. The method of claim 1, wherein said network is the Internet.

3. The method of claim 1, further including if said transmission schedule is empty, adding one or more popular titles to said transmission schedule.

4. The method of claim 3, wherein said one or more popular titles are determined by statistical analysis of past requests by users.

5. The method of claim 1, wherein said encryption algorithm is based on the Pretty Good Privacy (PGP) standard.

6. The method of claim 1, wherein the method further includes:
   receiving the encrypted audiovisual data corresponding to said request using said satellite dish;
   storing said encrypted audiovisual data corresponding to said request in said storage device; and
   decrypting said encrypted audiovisual data using said decryption key.

7. The method of claim 6, further including:
   sending a query from the set-top box to an operator server through the network for a list of available titles, said operator server coupled to a database;
   compiling a list of available titles by scanning said database; and
   transmitting said list of available titles from the operator server to the set-top box.

8. The method of claim 6, wherein said storage device is a hard disk.

9. The method of claim 1, wherein the audiovisual data is a movie.

10. The method of claim 1, further including informing the user of a planned transmission time for said encrypted audiovisual data corresponding to said request.

11. The method of claim 1, wherein said encrypted audiovisual data corresponding to said request has a playing speed, and said transmitting includes transmitting said encrypted audiovisual data at a rate faster than said playing speed.

12. The method of claim 1, wherein said encrypted audiovisual data corresponding to said request has a playing speed, and said transmitting includes transmitting said encrypted audiovisual data at a rate slower than said playing speed.

13. A system for delivery of audiovisual data to a user, including:
   a database having one or more pieces of audiovisual data, each piece of audiovisual data having a title;
   a transmitter coupled to said database;
   an operator server coupled to a network and said database, said operator server configured to receive a request for audiovisual data from the user via a network, determine if said title is already in a transmission schedule, add said title to said transmission schedule if it is not already in said transmission schedule, encrypt said audiovisual data corresponding to said request using an encryption algorithm having a corresponding decryption algorithm, generate a decryption key unique to the user using said corresponding decryption algorithm, and forward said decryption key to the user via said network; said database configured to forward said one or more pieces of audiovisual data to said transmitter according to said schedule; and said transmitter designed to transmit encrypted audiovisual data to a satellite for receipt by the user with a satellite dish, wherein the user has a set-top box coupled to said network, and the satellite dish coupled to the set-top box, said satellite dish designed to receive said encrypted audiovisual data corresponding to said request, wherein the set-top box contains a storage device to store encrypted audiovisual data corresponding to said request in said storage device and decrypt said audiovisual data using said decryption key.

14. The system of claim 13 wherein said network is the Internet.

15. The system of claim 13, wherein said operator server is further configured to add one or more popular titles to said transmission schedule if said transmission schedule is empty.

16. The system of claim 15, wherein said one or more popular titles are determined by statistical analysis of past requests by users.

17. The system of claim 13, wherein said encryption algorithm is based on the Pretty Good Privacy (PGP) standard.

18. The system of claim 13, wherein the audiovisual data is a movie.

19. The system of claim 13, wherein said set top box is further configured to send a query to said operator server through said network for a list of available titles and said operator server is further configured to compile a list of available titles by scanning said database and transmit said list of available titles to said set-top-box.

20. The system of claim 13, wherein said storage device is a hard disk.

21. The system of claim 13, wherein said operator server is further configured to relate a planned transmission time for said encrypted audiovisual data corresponding to said request to the user through said network.

22. The system of claim 13, wherein said encrypted audiovisual data corresponding to said request has a playing speed, and said operator server is further configured to transmit said encrypted audiovisual data at a rate faster than said playing speed.

23. The system of claim 13, wherein said encrypted audiovisual data corresponding to said request has a playing speed, and said operator server is further configured to transmit said encrypted audiovisual data at a rate slower than said playing speed.

24. An apparatus for delivery of audiovisual data to a user, including:
  means for receiving a request for audiovisual data from the user via a network, said audiovisual data corresponding to said request having a title;
  means for determining if said title is already in a transmission schedule;
  means for adding said title to said transmission schedule if it is not already in said transmission schedule;
  means for encrypting said audiovisual data corresponding to said request using an encryption algorithm, said encryption algorithm having a corresponding decryption algorithm;
  means for generating a decryption key unique to the user using said corresponding decryption algorithm;
  means for forwarding said decryption key to the user via said network; and
  means for transmitting said encrypted audiovisual data corresponding to said request to a satellite for receipt by the user with a satellite dish, said transmitting occurring in accordance with said transmission schedule, wherein the user has a set-top box coupled to said network, and the satellite dish coupled to the set-top box, wherein the set-top box contains a storage device.

25. The apparatus of claim 24, wherein said network is the Internet.

26. The apparatus of claim 24, further including means for adding one or more popular titles to said transmission schedule if said transmission schedule is empty.

27. The apparatus of claim 26, wherein said one or more popular titles are determined by statistical analysis of past requests by users.

28. The apparatus of claim 24, wherein said encryption algorithm is based on the Pretty Good Privacy (PGP) standard.

29. The apparatus of claim 24, wherein the apparatus further includes:
  means for receiving the encrypted audiovisual data corresponding to said request using said satellite dish;
  means for storing said encrypted audiovisual data corresponding to said request in said storage device; and
  means for decrypting said encrypted audiovisual data using said decryption key.

30. The apparatus of claim 29, further including:
  means for sending a query from the set-top box to an operator server through the network for a list of available titles, said operator server coupled to a database;
  means for compiling a list of available titles by scanning said database; and
  means for transmitting said list of available titles from the operator server to the set-top box.

31. The apparatus of claim 29, wherein said storage device is a hard disk.

32. The apparatus of claim 24, wherein the audiovisual data is a movie.

33. The apparatus of claim 24, further including means for informing the user of a planned transmission time for said encrypted audiovisual data corresponding to said request.

34. The apparatus of claim 24, wherein said encrypted audiovisual data corresponding to said request has a playing speed, and said operator server is further configured to transmit said encrypted audiovisual data at a rate faster than said playing speed.

35. The apparatus of claim 24, wherein said encrypted audiovisual data corresponding to said request has a playing speed, and said operator server is further configured to transmit said encrypted audiovisual data at a rate slower than said playing speed.

36. A program storage device readable by a machine, tangibly embodying a program of instructions executable by the machine to perform a method for delivery of audiovisual data to a user, including:
  receiving a request for audiovisual data from the user via a network, said audiovisual data corresponding to said request having a title;
  determining if said title is already in a transmission schedule;
  adding said title to said transmission schedule if it is not already in said transmission schedule;
  encrypting said audiovisual data corresponding to said request using an encryption algorithm, said encryption algorithm having a corresponding decryption algorithm;
  generating a decryption key unique to the user using said corresponding decryption algorithm;
  forwarding said decryption key to the user via said network; and
  transmitting said encrypted audiovisual data corresponding to said request to a satellite for receipt by the user with a satellite dish, said transmitting occurring in accordance with said transmission schedule, wherein the user has a set-top box coupled to said network, and the satellite dish coupled to the set-top box, wherein the set-top box contains a storage device.

37. A method for delivery of audiovisual data to a user, including:
  receiving a request for audiovisual data from the user via a network, said audiovisual data corresponding to said request having a title;
  determining if said title is already in a transmission schedule;
  adding said title to said transmission schedule if it is not already in said transmission schedule;

encrypting said audiovisual data corresponding to said request using an encryption algorithm, said encryption algorithm having a corresponding decryption algorithm;

generating a decryption key unique to the user using said corresponding decryption algorithm;

forwarding said decryption key to the user via said network; and transmitting said encrypted audiovisual data corresponding to said request to a satellite for receipt by the user with a satellite dish, said transmitting occurring in accordance with said transmission schedule;

receiving the audiovisual data corresponding to said request using a satellite dish coupled to a set-top box associated with said user, said set-top box coupled to said network and comprising a storage device;

storing said encrypted audiovisual data corresponding to said request in said storage device; and decrypting said audiovisual data using said decryption key.

38. The method of claim 37, further including:

sending a query from the set-top box to an operator server through the network for a list of available titles, said operator server coupled to a database;

compiling a list of available titles by scanning said database; and transmitting said list of available titles from the operator server to the set-top box.

39. The method of claim 37, wherein said storage device is a hard disk.

* * * * *